United States Patent [19]

Cohn

[11] Patent Number: 5,387,916
[45] Date of Patent: Feb. 7, 1995

[54] AUTOMOTIVE NAVIGATION SYSTEM AND METHOD

[75] Inventor: Marvin Cohn, Baltimore, Md.

[73] Assignee: Westinghouse Electric Corporation, Pittsburgh, Pa.

[21] Appl. No.: 133,499

[22] Filed: Oct. 8, 1993

Related U.S. Application Data

[63] Continuation-in-part of Ser. No. 923,288, Jul. 31, 1992, Pat. No. 5,254,997.

[51] Int. Cl.[6] ............................................. G01S 13/80
[52] U.S. Cl. ..................................... 342/44; 342/46; 342/51
[58] Field of Search .................. 342/44, 50, 51, 46

[56] References Cited

U.S. PATENT DOCUMENTS

| | | | |
|---|---|---|---|
| 3,715,749 | 2/1973 | Archer | 342/157 |
| 3,731,313 | 5/1973 | Nagai | 343/893 X |
| 3,754,257 | 8/1973 | Coleman | 342/370 |
| 3,757,335 | 9/1973 | Gruenberg | 342/367 |
| 3,898,663 | 8/1975 | Albert | 342/187 |
| 3,914,762 | 10/1975 | Klensch | 342/44 |
| 3,938,151 | 2/1976 | Trenam | 343/795 X |
| 3,958,246 | 5/1976 | Wohlers et al. | 342/6 X |
| 4,031,535 | 6/1977 | Isbister | 342/46 |
| 4,210,910 | 7/1980 | Wohlers | 342/60 |
| 4,347,512 | 8/1982 | Sweeney | 342/6 |
| 4,806,938 | 2/1989 | Meadows | 342/370 |
| 4,985,707 | 1/1991 | Schmidt et al. | 342/370 |
| 5,064,140 | 11/1991 | Pittman et al. | 244/3.13 |
| 5,254,997 | 10/1993 | Cohn | 342/44 |

Primary Examiner—John B. Sotomayor
Attorney, Agent, or Firm—Eugene LeDonne

[57] ABSTRACT

A navigation system for a vehicle travelling along a highway that has an interrogator mounted on the vehicle and, a retrodirective transponder mounted alongside the highway for updating vehicle location. For collision avoidance systems, interrogators transmit and receive fore and aft, and transponders are mounted to respond to signals fore and aft of the vehicle. The transponder modulates information onto the interrogation signal, and retransmits the encoded interrogation signal back in the direction of arrival of the collected interrogation signal. The responder uses a Van Atta array antenna and is capable of responding to an interrogator signal incident over a wide solid angle of arrival while retrodirectively retransmitting without amplification substantially all of the collected signal within a narrow solid angle. The responder may be implemented using monolithic microwave integrated circuit technology (MMIC), thus being suitable for high volume production.

36 Claims, 5 Drawing Sheets (i,j) ELEMENT CONNECTED TO (N-i+1,M-j+1)
VAN ATTA RETRODIRECTIVE ARRAY

AUTOMOTIVE NAVIGATION SYSTEM AND METHOD

This is a continuation-in-part of U.S. patent application Ser. No. 07,923,288 filed Jul. 31, 1992, now U.S. Patent No. 5,254,997 which is relied upon and incorporated by reference.

BACKGROUND OF THE INVENTION

1. Field of the Invention

The present invention relates to automotive navigation; and more particularly, to apparatus and a method for transmitting navigation information to vehicles traveling along a highway.

2. Description of Related Art

An intelligent vehicle highway system has been proposed which is to include automotive navigation, including vehicle location as part of a map following system wherein instructions are transmitted to vehicle drivers as the vehicle proceeds to a preselected destination. Various features for such a system have been proposed, such as a collision avoidance feature where vehicles are either controlled, or the drivers warned of, potentially dangerous traffic conditions. This would be extremely important, in fog, or other types of weather that limit the driver's visibility.

Further, automatic toll collecting systems have been proposed where the automotive vehicle is not required to stop when entering the approach to a toll bridge or highway.

All of these proposed systems require, to a greater or lesser extent, communication between fixed locations and the moving vehicle. For example, in the map following system, as the vehicle moves along a directed path, it accumulates location errors. The location correction of these errors could be supplied by continuously broadcasting radio beacons located at appropriate points along the highway, or by transmitters that only transmit when activated. Similarly, various conditions and situations can be transmitted to the vehicle as it travels along the highway; and where tolls are automatically debited to a user's telephone, for example, communication between the entrance to the toll station and the vehicle is required. The apparatus used in the aforementioned systems is relatively expensive to manufacture and maintain, requires high power to operate, a source of RF energy at a transponder; and is subject to substantial interference from other vehicles communicating at relatively close distances, which complicates the signal sorting and processing for the receiver.

In light of the foregoing, there is need for an automotive navigation system and method that is relatively simple in construction, inexpensive to manufacture and maintain, economical and reliable in operation with minimal interference between nearby vehicles, and has relatively uncomplicated signal sorting and processing.

SUMMARY OF THE INVENTION

Accordingly, the present invention is directed to an automotive navigation system and method that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages, and in accordance with the purpose of the invention, as embodied and broadly described, the invention is a navigation system for a vehicle traveling along a highway. The system includes an interrogator mounted on the vehicle, where the interrogator includes an antenna means for transmitting an interrogation signal at a predetermined angle relative to the highway. A responder is positioned to receive the interrogation signal. The responder includes a receiving antenna for collecting the interrogation signal from the vehicle mounted interrogator at times when the vehicle is traveling along a highway within a prescribed range of distance from the responder. The responder has encoding means coupled to the receiving antenna for imposing information on the collected interrogation signal. The transponder also has retrodirective means connected to the encoding means for retransmitting the encoded collected interrogation signal in the direction of the vehicle mounted interrogator as a responder signal. The interrogator includes a receiving antenna for collecting the responder's signal, and means for decoding the encoded information relating to the navigation of the vehicle.

In another aspect, a method of providing navigation information to a moving vehicle includes transmitting an interrogation signal to a responder positioned adjacent the highway over which the vehicle is traveling for collecting the interrogation signal, collecting the interrogation signal at the responder, imposing encoded information on the interrogation signal collected by the responder, retrodirecting the interrogation signal encoded with the information in the direction of the vehicle as a responder signal, and collecting the responder signal on the vehicle.

In still another aspect, the invention is either a responder mounted on a vehicle and/or adjacent one of the side boundaries defining a highway including a receiving antenna for collecting an interrogation signal from a vehicle mounted interrogator at times when the vehicle is traveling along the highway within a prescribed range from the receiving antenna, and coding means coupled to the receiving antenna for imposing information on the collected interrogation signal, retrodirective means connected to said encoding means for transmitting the interrogation signal in the direction of the vehicle mounted interrogator as a responder signal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention, and together with a description serve to explain the principals of the invention.

DESCRIPTION OF PREFERRED EMBODIMENT

Figure 1:
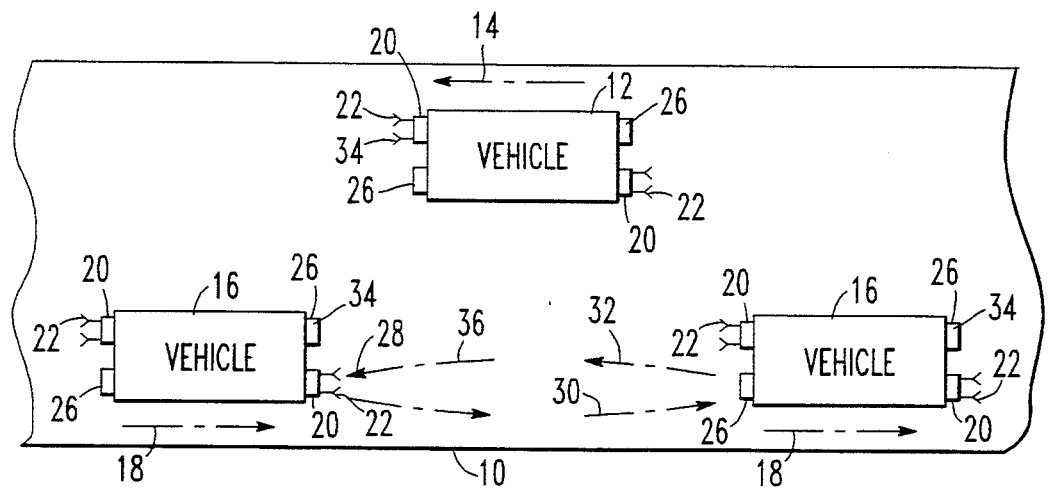
FIG. 1 is a diagram of a section of highway illustrating a number of vehicles equipped with interrogators and transponders of a collision advance system in accordance with one embodiment of the present invention.

In describing the preferred embodiments, reference is made to the drawings wherein like reference numerals refer to like parts, to the extent possible.

The invention provides a navigation system for vehicles traveling along a highway in opposite directions. An interrogator is mounted on the vehicle, which includes an antenna means for transmitting an interrogation signal at a predetermined angle relative to the direction of travel of the vehicle.

Figure 2:
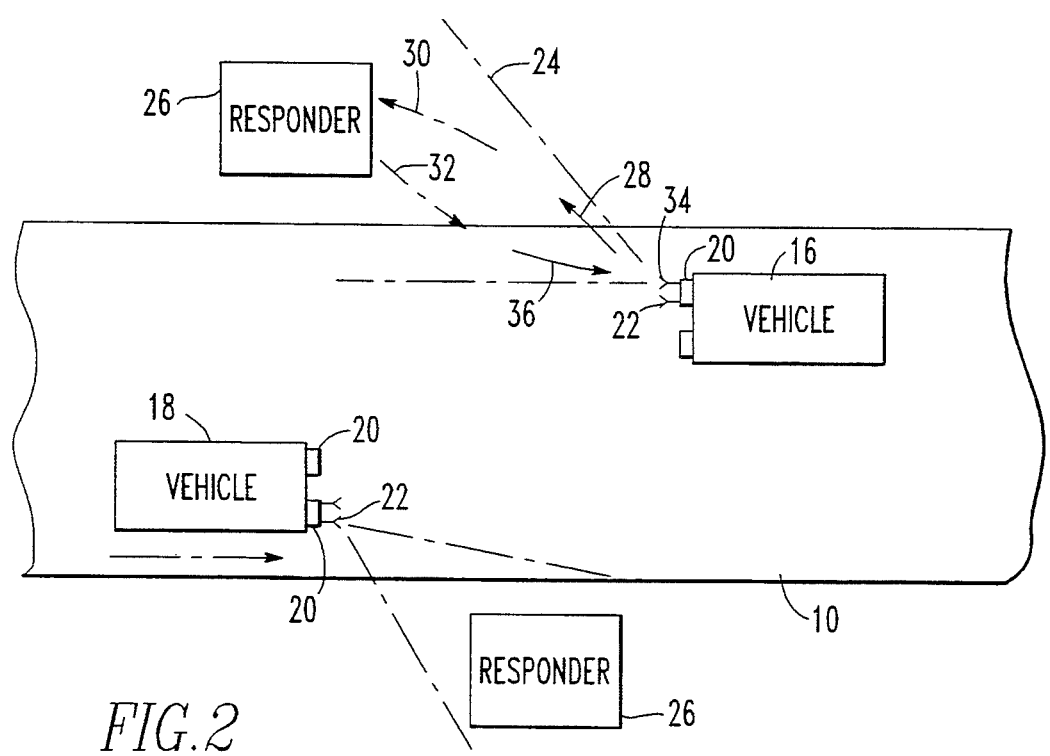
FIG. 2 is a diagram of a section of highway having a pair of transponders of a navigation system mounted alongside and illustrating a pair of vehicles travelling in opposite directions and equipped with interrogators for interrogating the transponders in accordance with another embodiment of the invention.

As shown in FIGS. 1 and 2, a highway 10 has one lane of traffic in each direction. This highway is shown for illustration purposes. However, in actual practice, the system of the present invention is operable on highways with many more lanes in each direction. FIG. 1, which shows a vehicle 12 traveling in the direction of arrow 14 and vehicles 16 travelling in the direction of arrow 18 are described in connection with a collision avoidance type navigation system. As shown in FIG. 2 vehicles 16 and 18 traveling in opposite directions are described in connection with a map following type navigation system. In FIG. 2 vehicles 16 and 18 carry an interrogator 20 which has a transmitting antenna 22 for transmitting an interrogation signal along the highway 10 in the form of a beam 24. Preferably, the beam 24 is transmitted at an oblique angle to a direction of travel of the vehicle to illuminate a respective transponder 26 located on the opposite sides of the highway. For the collision avoiding system of FIG. 1, interrogators 20 are mounted at convenient locations on the vehicle 12 and 16 to transmit beams such as 24 forwardly and rearwardly of the vehicles. The interrogators 20 together with their antennae 22 are mounted to send interrogation signals in opposite directions along a highway in order to provide for collision avoidance both ahead of a particular vehicle and behind a particular vehicle.

In accordance with the invention, a transponder, which is also referred to as a responder, is positioned to receive the interrogation signal when the vehicle interrogator reaches a position close enough to a responder to illuminate the responder. As herein embodied, for the map following type navigation system of FIG. 2, responders 26 are positioned adjacent opposite sides the boundary of the highway 10. For the collision avoiding system, responders 26 are mounted at both the front and rear portions of the vehicles 12 and 16 in order to advise the host vehicle as to the speed and proximity of vehicles both in front and behind.

However, vehicle mounted collision and obstacle warning radars will rarely have any difficulty detecting threats, rather their problem is the many sources of false alarms. Cooperative collision warning systems using RDTs minimize or eliminate false alarms which plague radar warning devices and also can provide information on the speed and direction of the RDT bearing vehicle that is interrogated. Responders mounted at the front and rear of a vehicle would have different modulation codes so that an interrogating vehicle can distinguish oncoming vehicles from those traveling in the same direction.

The speed of the responder bearing vehicle would be included in the modulated return and thus the interrogating vehicle can distinguish a hazardous closing situation from a normal following situation in which the gap between vehicles is constant or increasing. In essence the information can be incorporated as part of an intelligent cruise control system.

Similarly obstacles and hazards such as bends in the road can be unambiguously identified by RDTs that are coded to indicate the type of fixed obstacle being marked.

The map following system consists of a vehicle borne interrogator and a number of coded low power drain responders along the road. The modulation codes would provide location information and distinguish the responders response from clutter return within the interrogator's beam. The interrogator's receiver extracts the responders location information to provide a correction to its map following data bank. The retrodirective feature of the transponder results in a reduced interrogator transmitter power requirement and reduced interference at the interrogator receiver, since the response is directed back to the illuminating vehicle's interrogator rather than broadcast over a large angle where it could interfere with other interrogator receivers.

Although the responder concept can be implemented anywhere within the UHF, microwave or millimeter wave bands, there are advantages to operation at millimeter wavelengths.

The advantages are, of course, the ability to achieve a narrow interrogator beamwidth and a narrow retrodirective beam with a small interrogator antenna and a small responder, respectively. The well known disadvantage of millimeter wave operation is atmospheric propagation loss due to absorption resulting from water vapor and oxygen and scattering by rain and fog. In the example that follows, it is shown that these loss mechanisms have a negligible effect for short range automotive applications. The non-fluctuating atmospheric loss can beneficially be used to reduce interference from distant interrogators and transponders.

The system of the present invention provides for responders with receiving antenna means for collecting the interrogation signal from the vehicle mounted interrogator at times when the vehicle is traveling along the highway within a prescribed distance from said receiving antenna means. The responder device or tag 26 preferably uses a two-dimensional Van Atta array antenna having a plurality of paired antenna elements arranged in diagonal symmetry around the center of the array. Each pair of antenna elements is connected by a transmission line of approximately equal length. Presently preferred embodiments of the transponder 26 include a low frequency bilateral modulation mechanism which is interposed in the transmission line between the paired antenna elements.

Again, as shown in FIGS. 1 and 2 each of the interrogators 20 illuminates a responder device or tag 26 by radiating electromagnetic energy in the form of an interrogator transmitted signal 28 from the transmitting antenna 22. At the responder device 26, signal 28 is collected as a receive signal 30. Responder 26 then retransmits substantially all of the collected portion of the interrogator signal as a tagged transmitted signal 32. Signal 32 can be encoded with information that is desired to be sent to the interrogator 20. For the collision avoidance system of FIG. 1, the information contained in the signal 32 is preferably the presence and speed of the responding vehicle. For the map following system of FIG. 2, the information contained in the signal 32 is preferably the geographical location of the interrogated transponder.

Signal 32 returns to the interrogator 20 and is collected by a receiving antenna 34 as interrogator receive signal 36. Information regarding the responder 26 is extracted through processing of the collected signal 36 by the interrogator 20.

The principal of operation of the retrodirective transponder (RDT) referred to as 26 is based on the well known Van Atta array that has the ability to reradiate an incident RF wave in the direction from which it came; that is retrodirectively. While passing through the responders integral monolithic modulators, which are preferably gallium arsenide, the RF wave can be modulated by information that is automatically transmitted back to the interrogator.

The modulator used in the transmission line may be a bilateral modulator or a unilateral modulator. With a bilateral modulator, the interrogation signal can be collected by one element of the antenna pair, modulated, and retransmitted out of the other antenna pair element and vice versa. With a unilateral modulator, the interrogation signal can be modulated in only one direction. This property halves the number of effective transmitting antenna elements (n).

Because retrodirective power is proportional to $n^2$, unilateral modulators reduce the reflected power to 25% of that achieved by bilateral modulators. One way to offset this power loss is to add signal amplifiers to each unilateral modulator. Although retransmission power is increased by the amplifiers, the complexity and power consumption of the unilaterally modulated and amplified Van Atta array antenna also is increased.

The modulation mechanism of this invention can be used to impose a code upon the outgoing signal that relates to the location of the transponder 26 for the map following mode, or the direction of travel and speed of vehicles equipped with transponders in the collision avoidance mode; modulate the signal in either direction of propagation and absorb the interrogation signal when the information to be modulated onto the retrodirective signal is in the "STOP" condition. In the "STOP" condition, the responder device 26 is in a quiescent state and does not retransmit the interrogation signal back in the direction of the interrogator. No amplification of the modulated interrogation signal is required before retransmission to the interrogator by the Van Atta array.

The responder device described herein implements a Van Atta array antenna structure with monolithic microwave integrated circuit (MMIC) technology thereby realizing a small, low-power, inexpensive, and an inherently reliable retrodirective identification device suitable for high-volume production. Alternately, the array may be fabricated with hybrid microwave integrated circuits and discrete devices, when a larger modulatable Van Atta array antenna is desired or acceptable.

Although the device as described is polarization-sensitive, the device may also be made polarization-insensitive. In addition, the system may be designed such that it can perform over a wide range of operating frequencies.

Figure 3:
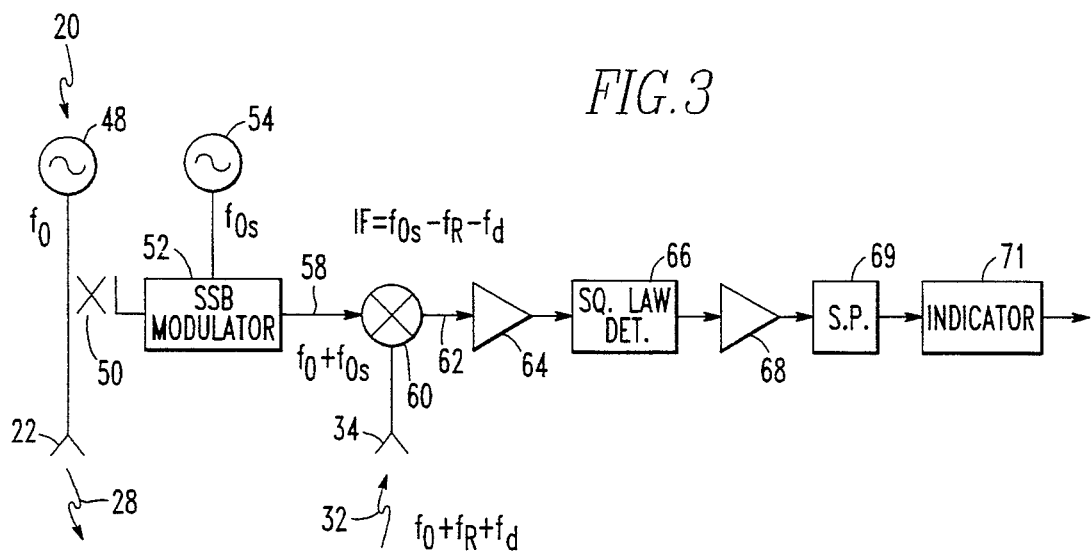
FIG. 3 is a schematic diagram showing the details of the interrogators of FIGS. 1 and 2 in accordance with one embodiment of the present invention.

As shown in FIG. 3, interrogator transmitted signal 28, is generated at frequency $f_o$ within interrogator 20, by radio frequency (RF) oscillator 48. This signal then is propagated to responder device 26, through transmitting antenna 22. The output of RF oscillator 48 is also directed through directional coupler 50, into single-sideband (SSB) modulator 52 along with the output of local oscillator 54. Oscillator 54 operates at frequency $f_{os}$. Modulator 52 generates offset local oscillator signal $(f_o+f_{os})$ on line 58.

Offset local oscillator signal on line 58, is input into interrogator receiver mixer 60, along with interrogator received signal $(f_o+f_R+f_d)$ 28 to generate intermediate frequency (IF) $(f_{os}-f_R-f_d)$ on line 62. Signal $f_d$ represents the Doppler shift due to relative velocity between interrogator 20, and responder 26. Signal $f_R$ represents the modulation frequency of responder 26. IF signal 62 is amplified by IF signal amplifier 64. IF amplifier 64 output is demodulated by square law detector 66. This signal then is amplified by modulation signal amplifier 68, yielding modulation signal ($f_R$) 70, which had been imposed at the responder device. The amplified modulated signal at 68 is processed by a signal processor 69, and the information is then manifest at indicator 71. In a map following system, this indicator 71 provides navigation information, such as a geographic location or a latitude and longitude correction, or the highway equivalent from a previous checkpoint. In a collision avoidance system the indicator displays speed of approaching and following vehicles, and the distance or location of obstructions, where a transponder is mounted on a highway construction approach, for example. Also, in the event of excessive speed indications and highway obstructions, an audible alarm sounds. Notice that the interrogator transmitter may be separate from the interrogator receiver, but the receiver must be within the response angle of the retrodirective beam.

Figure 4:
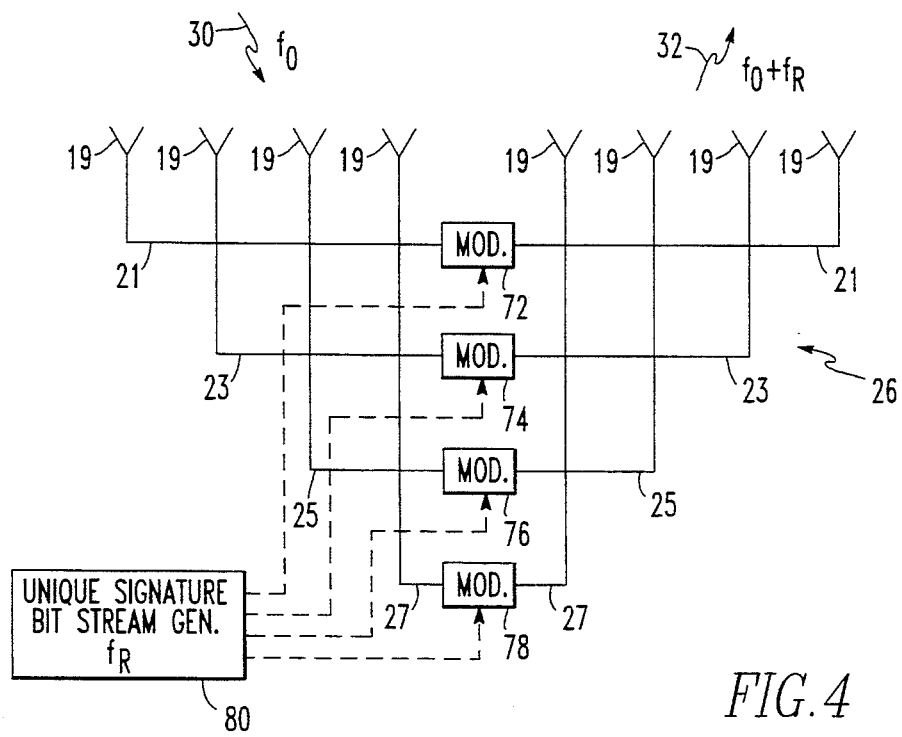
FIG. 4 is a schematic block diagram showing the details of the transponders of FIGS. 1 and 2 according to one embodiment of the present invention.

FIG. 4 illustrates a responder device or tag, 26, which uses a linearly-arranged Van Atta array antenna. Tag or transponder 26 received signal, 30, is collected by a plurality of paired antenna elements, 19a–h, on responder 26. Each pair of antenna elements 19a–h, 19b–g, 19c–f, 19d–e, is arranged symmetrically around the center of the array. Each pair of antenna elements is connected by a transmission line 21a–b, 23a–b, 25a–b, 27a–b, of approximately equal length. One presently preferred embodiment of the device includes a low frequency bilateral modulation mechanism 72, 74, 76, 78, which is interposed in the transmission lines 21a–b, 23a–b, 25a–b, 27a–b, between paired antenna elements 19a–h.

It should be noted that bilateral modulation mechanism 72, 74, 76, 78, allows tag received signal 30, to be collected by the left-hand antenna element 19a–d, modulated, and retransmitted out of the right-hand antenna elements 19e–h and vice versa. Signature generator 80, generates the unique code that is imposed as navigation information upon the tag received signal, 30. In conjunction with signature generator 80, the bilateral modulation mechanism 72, 74, 76, 78, imposes a unique identification code upon outgoing tag transmitted signal 32, and modulates the signal in either direction of propagation with frequency $f_R$. After modulation tag transmitted signal 32, with frequency $(f_o+f_R)$, is retransmitted from array elements 19e–h.

In addition, bilateral modulation mechanism 72, 74, 76, 78, can absorb tag received signal 30, when the information to be modulated onto the signal is in the "STOP" condition.

Figure 5:
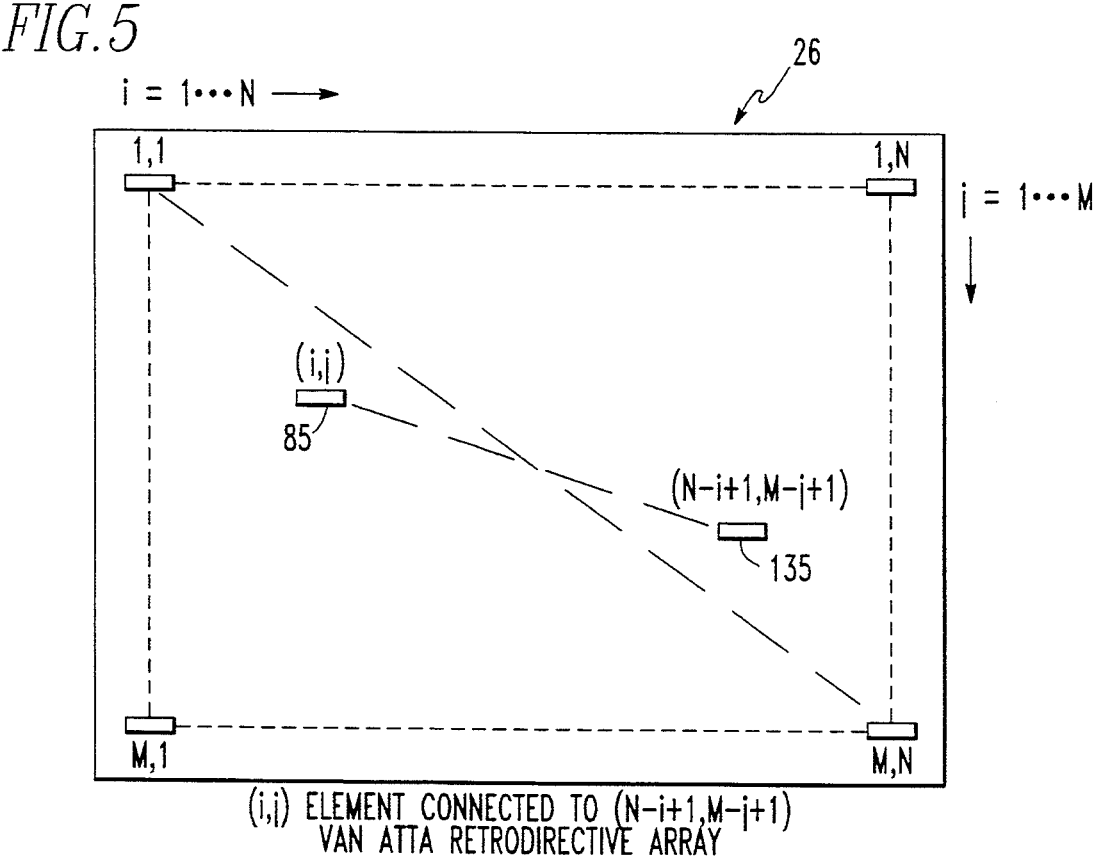
FIG. 5 is a schematic circuit representation of a preferred transponder in accordance with the present invention.

FIG. 5 represents a Van Atta retrodirective array antenna 26. Array 26 consists of M rows and N columns of antenna radiating elements. Diagonal symmetry should be maintained, that is, the (i, j) element should be connected to the (N−i+1, M−j+1) element. For example in FIG. 5, element 85 should be connected to element 135. Each pair of array elements, such as element 85 and element 135, is connected by a transmission line of approximately equal length in which a modulating device is interposed, similar to the arrangement connecting paired antenna elements such as 19a–h, as shown in FIG. 4.

Figure 6:
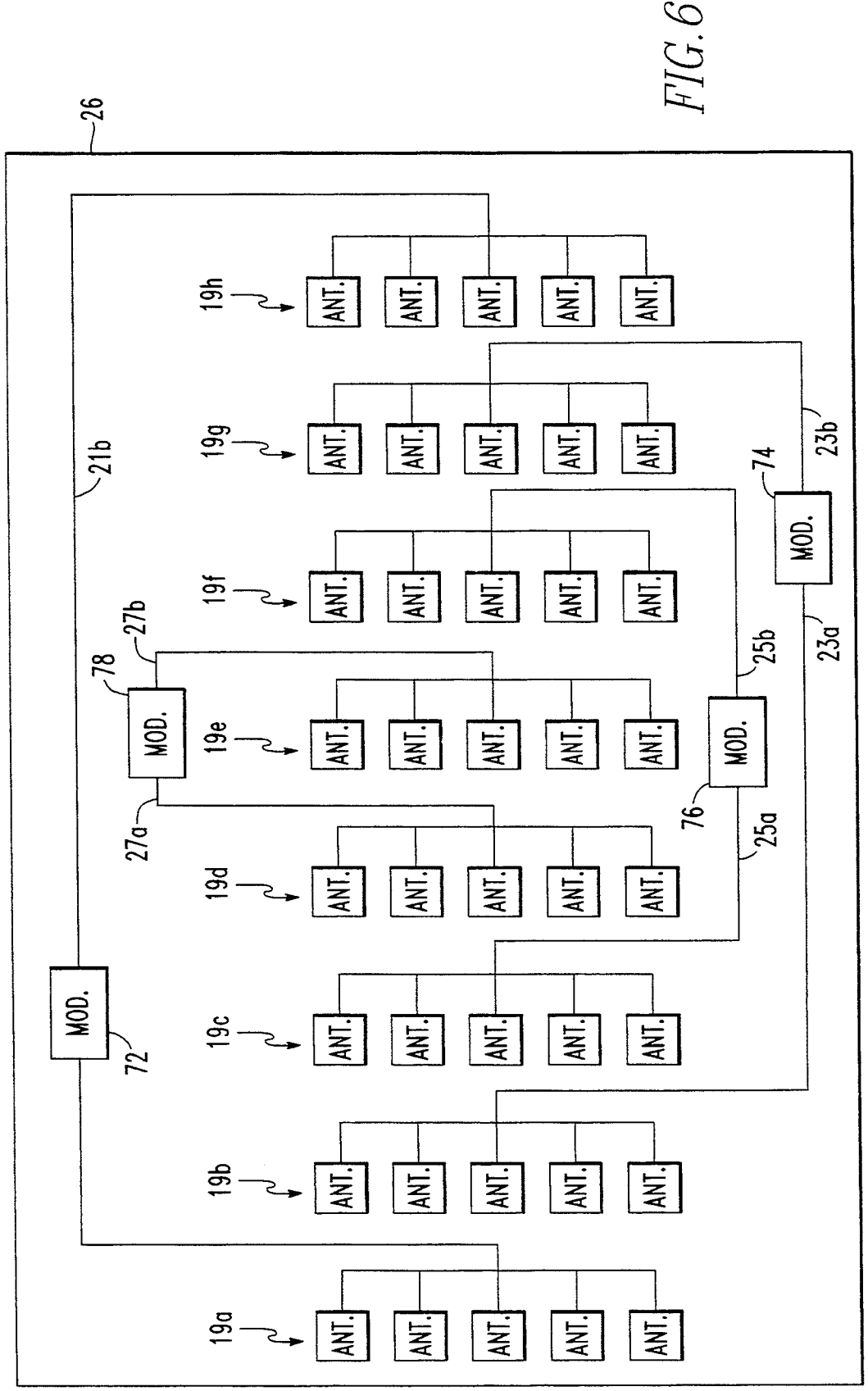
FIG. 6 is a schematic structural representation of a preferred transponder in accordance with one embodiment of the present invention.

FIG. 6 shows a preferred arrangement of a responder 26 for the automotive navigation system and method of the present invention wherein each element 19 of the array is a subarray of five patch antennas with eight elements. In actual practice, the transponder of FIG. 6 designed for operation at a wavelength of five millimeters measures approximately 21 mm by 18 mm. With a transponder as shown in FIG. 6, the system performance is calculated as follows.

The back scattering cross-section ($\sigma_{RD}$) of a responder containing N elements is $$\sigma_{RD} = \frac{(NG_e\lambda_o)^2 L_M L_T L_p}{4\pi} \cos^2\phi \qquad (1)$$

where $G_e$ is the gain of the individual radiating element (which can be a sub-array of basic elements, e.g., patches, dipoles, slots, etc.), $\lambda$ is the free space wavelength and $L_M$, $L_T$ and $L_P$ (all $\leq 1.0$) are, respectively, the losses due the modulator, interconnecting transmission lines and polarization misalignment. $\phi$ is the angle between the normal to the RDT and direction of the wave incident on the transponder.

Utilizing the radar equation (2), equation (1) for the responder scattering cross-section and atmospheric attenuation data for various weather conditions, the minimum required interrogator transmitter power ($P_T$) can be calculated $$(P_T)_{MIN} = \frac{(4\pi)^3 R^4_{MAX}}{\sigma_{RD} G^2_T \lambda_o^2} (P_R)_{MIN} \qquad (2)$$

where $G_T$ is the gain of the interrogator antenna and the minimum interrogator receiver power level $(P_R)_{MIN} \sim (S/N)_{MIN} F k T B_{EFF}$. F is the interrogator receiver's noise figure, $(S/N)_{MIN}$ and $B_{EFF}$ are, respectively, the interrogator receiver's minimum signal to noise ratio and effective noise bandwidth.

If one assumes a responder like that shown in FIG. 6 consisting of a $\lambda/2$ spaced $5\times 8$ array of patch radiators in which all 5 patches in each column are connected together to form a sub-array, then $n=8$ and $G_e=12$ db$-15.8$. In this short range application ($R_{MAX}=50$ m), assume operation at 60 Hz ($\lambda,=5$ mm.) which is near the center of the oxygen absorption band. Further assume $L_m=0.5$ (3 db loss), $L_T \sim 0.79$ (1 db loss), $L_p=\cos^4\theta_p \geq 0.78$ (a 20° maximum polarization misalignment) and $\phi_{max}=45°$ $$\sigma_{RD} \geq 4.88 \times 10^{0.3} m^2$$

The Van Atta array portion of the responder, which contains four bilateral modulators (possibly on a single GaAs chip), will have dimensions of $\sim 21 \times 14$ mm. Its response beamwidth (which is retrodirective only in the azimuth plane) is $=15°$ in azimuth and $=23°$ in elevation.

If the modulated response from the responder is a 32 bit word transmitted in 0.1 second, the required interrogator receiver bandwidth $(B_{EFF})=640$ Hz. Conservatively assuming a noise figure $(F)=15$ db and $(S/N)_{MIN} \sim 16$ db, $(P_R)_{MIN}=-145$ dbw$\sim 3.16 \times 10^{-15}$ watts. For $R_{max}=50$ m and $G_T=25$ db$=316$ (interrogator beamwidth $\sim 12°$), $P_T=3.2$ mW in free space.

At 60 GHZ, absorption due to oxygen is 16 db/Km resulting in a 1.6 db round trip loss which increases the required $P_T$ to 4.6 mW.

The 2-way atmospheric attenuation for various weather conditions and the resulting required interrogator transmitter power $(P_T)$ are shown in the following table.

| Weather | 2-Way Atmospheric Attenuation (db) | $P_T$ (mW) |
| --- | --- | --- |
| Clear | 1.6 | 4.6 |
| Fog (.32 g/m³ - visibility = 400 ft.) or light rain (1 mm./hr.) | 0.07 | 4.7 |
| Moderate rain (4 mm./hr.) | 0.24 | 4.9. |
| Fog (2.3 g/m³ - visibility = 100 ft.) | 0.47 | 5.2 |
| Heavy rain (16 mm./hr.) | 0.82 | 5.6 |

All of the required interrogator power levels are easily achieved with already demonstrated GaAs MMICs. Low noise mixers and amplifiers have also been demonstrated at these wavelengths. These developments show that compact low cost and low power drain interrogators as well as retrodirective transponders can be produced. That is important for automotive navigation systems where large quantities of interrogators as well as transponders are required.

Figure 7:
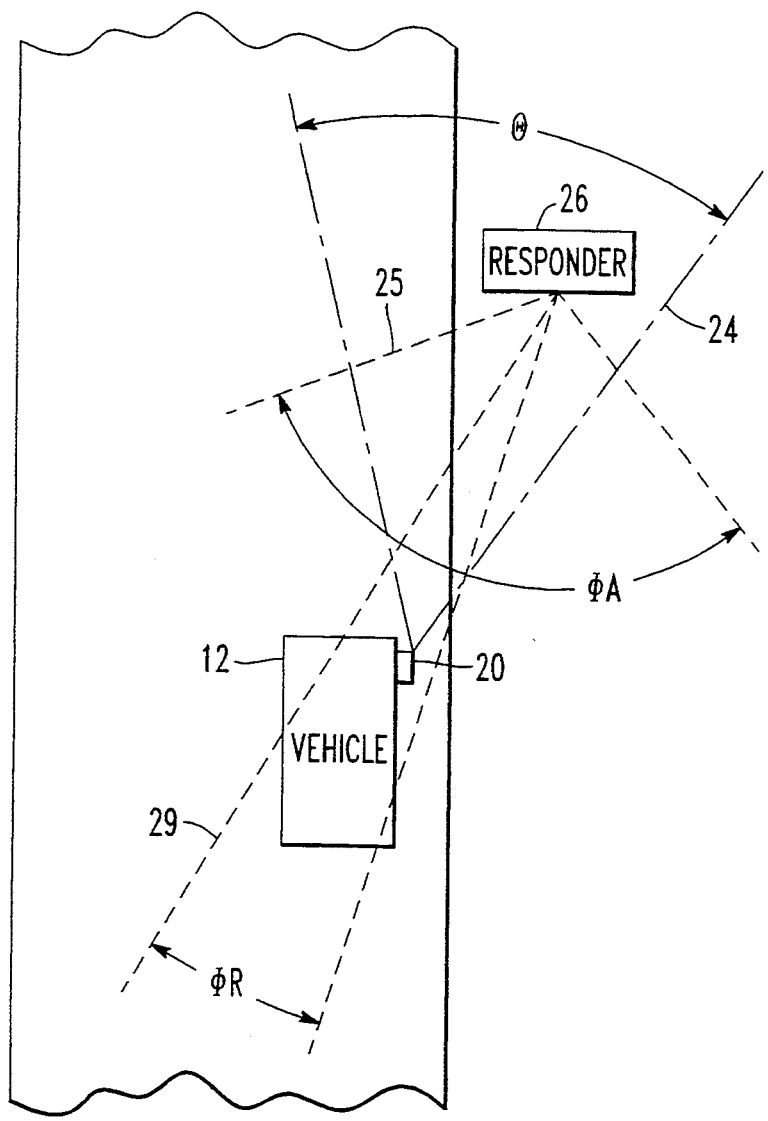
FIG. 7 is a schematic representation of a vehicle mounted interrogator approaching a transponder illustrating the respective beam widths of the interrogator and transponder in accordance with the present invention.

FIG. 7 illustrates an operational beamwidth diagram relevant to the system. Interrogator 20 illuminates responder 26 with an electromagnetic beam of interrogation beamwidth $\theta 24$. Tag acceptance beamwidth $\phi_A$, 25, represents the wide solid angle (such as three (3) steradians) over which the responder device 26 can accept interrogation signals. Tag acceptance beamwidth, 25, can approach a hemisphere and responder 26 can respond anywhere within that solid angle. However, the response of the responder 26 is concentrated within a smaller solid angle, namely tag response beamwidth $\phi_R$, 29. Tag acceptance beamwidth 25, is much greater than tag response beamwidth 29. Responder 26 concentrates and directs tag transmitted signal 32, back in the direction of tag received signal 30, and interrogator receiving antenna.

Figure 8:
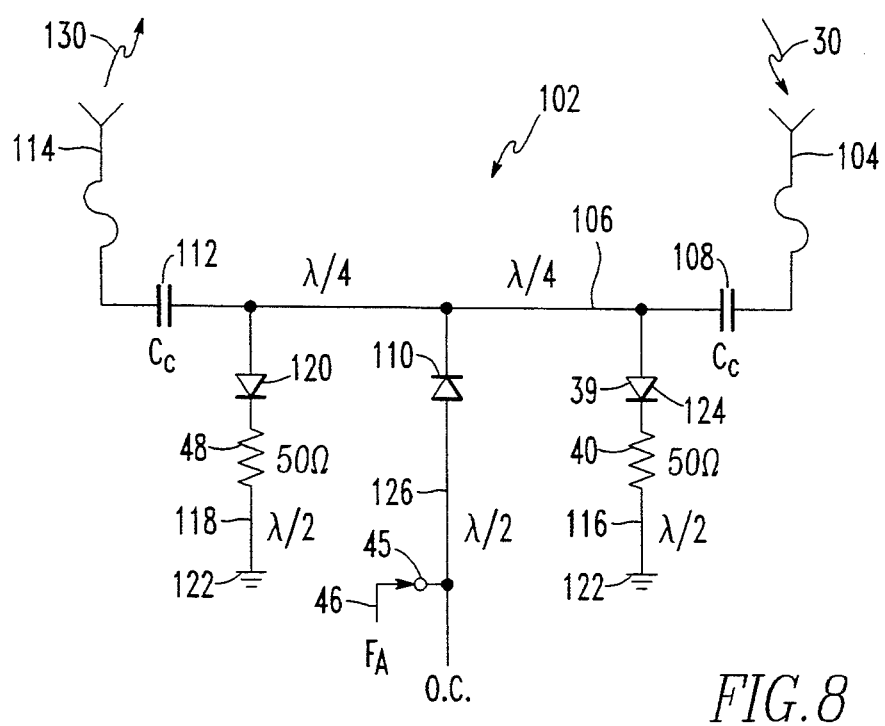
FIG. 8 is a circuit diagram of an embodiment of the responder of FIG. 4 using amplitude modulation of the signal collected by the array of FIGS. 4–6.

FIG. 8 illustrates one implementation of responder device absorptive modulation switch 102. Although FIG. 8 shows a switch intended to impose information upon the interrogation signal using amplitude modulation, other modulation methods, such as frequency or phase modulation, may be used to encode an interrogation signal before it is retransmitted back in the interrogator signal's direction of arrival. In addition, FIG. 8 shows a right-to-left direction of propagation of an interrogation signal. In a presently preferred embodiment, switch 102 is capable of propagating an interrogation signal simultaneously in both the right-to-left direction and the left-to-right direction.

In FIG. 8, unmodulated receive signal, 30, is collected by tag receiving element, 104, which is similar to array elements 19a-h in FIG. 4. Signal 30 is propagated to element interconnection transmission line, 106, through right coupling capacitor ($C_c$), 108. The effect of switch 102 on signal 30 depends on whether central branch diode 110 is in the forward-biased condition or the reverse-biased condition. The forward-biased condition is effected by placing a positive direct current voltage across central diode 110. The reverse-biased condition is effected by placing a negative direct current voltage across central diode 110. Each condition will be considered in turn. Because the bias voltage is direct current in nature, coupling capacitors, 108, 112, act to block bias current flow to the antenna radiating elements 104, 114.

With central diode 110 in the forward-biased condition, current flows through diode 110, and diverges towards right lateral transmission branch, 116, and left lateral transmission branch, 118. This direction of current flow places a forward bias on right lateral branch diode, 124, and left lateral branch diode, 120, causing the bias current to return to ground, 122, through the lateral transmission branches, 116, 118. Signal 30 is diverted to ground, 122, along with the bias current. Thus, signal 30 is absorbed instead of being retransmitted.

With central branch diode 110 in the reverse-biased condition, diode 110 presents a high capacitive impedance to signal 30. Similarly, lateral branch diodes 124, 120, present a high impedance to signal 30. Therefore, signal 30 bypasses lateral transmission branches 116, 118 and central transmission branch 126. Instead, signal 30 is accepted by tag receiving element 104, coupled through capacitor 108 to transmission line 106, propagated along transmission line 106 to capacitor 112, coupled through capacitor 112 to tag transmitting element, 114, and retransmitted as modulated transmitted signal, 130.

In FIG. 8, unmodulated signal 30 is modulated by switch 102 alternating between absorption and retransmission states thus creating modulated transmitted signal, 130. Alternately, signal 30 may be entirely absorbed or entirely retransmitted by modulator switch 102 in FIG. 8.

While a certain presently preferred embodiment of the invention has been illustrated, it is understood that the invention is not limited thereto but may be otherwise variously embodied and practiced within the scope of the following claims.

I claim:

1. A navigation system for a vehicle travelling along a highway, comprising:
    an interrogator mounted on the vehicle, the interrogator including an antenna means for transmitting an interrogation signal at a predetermined angle relative to the highway;
    a responder positioned to receive the interrogation signal, the responder including a receiving antenna means for collecting the interrogation signal from the vehicle mounted interrogator at times when the vehicle is travelling along a highway within a prescribed range of distance from the transponder, the responder including encoding means coupled to the receiving antenna means for imposing automotive navigation information on the collected interrogation signal, the responder including retrodirective means connected to the encoding means for retransmitting the encoding collected interrogation signal, the responder including means for retransmitting the encoded collected interrogation signal in the direction of the vehicle mounted interrogator as a responder signal;
    an interrogator receiving antenna on the vehicle for collecting the responder signal;
    means for decoding the encoded information to provide automotive navigation information; and
    indication means mounted to the vehicle for imparting the automotive navigation information to the vehicle operator.

2. The system of claim 1 wherein said retrodirective means comprises at least one receiving antenna means and at least one transmitting antenna means configured as a Van Atta array having at least one pair of antenna elements.

3. The system of claim 2 wherein
    (a) said Van Atta array is comprised of a plurality of paired antenna elements disposed in a two dimensional configuration, said paired antenna elements of said Van Atta array being disposed in diagonal symmetry around the center of said array; and
    (b) said encoding means is comprised of means for imposing said code signal to said interrogation signal intermediate each of said elements of respective pairs of said paired antenna elements.

4. The system of claim 3 in which said responder is fabricated of monolithic semiconductor material.

5. The system of claim 3 in which said responder is fabricated of a combination of monolithic semiconductor integrated circuits and discrete components mounted upon dielectric substrates.

6. The system of claim 1 wherein said encoding means further comprises an amplifier to amplify said encoded signal prior to transmission to said interrogator.

7. The system of claim 1 wherein said means for decoding said information further comprises a signal receiving means for selectively recognizing said encoded retrodirective signal from said responder.

8. The system of claim 2 wherein said encoding means further comprises means for transmitting said interrogation signal between each said element of said paired antenna elements.

9. The system of claim 2 wherein said encoding means further comprises a signal absorbing means in which said means for transmitting an interrogation signal between each element of said paired antenna elements absorbs said interrogation signal when said code signal to be imposed upon said interrogation signal passing through said means for transmitting is in "STOP" condition.

10. The system of claim 2 wherein said encoding means further comprises means for modulating said information on said interrogation signal intermediate said respective elements of said paired antenna elements.

11. The system of claim 10 wherein said means for modulating said information on said interrogation signal imposes said code signal upon said interrogator signal in either direction of propagation between said respective elements of said paired elements of said Van atta array.

12. The system of claim 10 wherein the encoding means further comprises means for imposing on said interrogation signal a code indicating speed of an approaching vehicle carrying the responder.

13. The system of claim 10 wherein the encoding means further comprises means for imposing on said interrogation signal a code indicating the geographic location of the responder.

14. The system of claim 10 wherein said means for modulating said information on said interrogation signal comprises amplitude modulation.

15. The system of claim 10 wherein said means for modulating said information on said interrogation signal comprises frequency modulation.

16. The system of claim 10 wherein said means for modulating said information on said interrogation signal comprises phase modulation.

17. The system of claim 9 wherein the said signal absorbing means further comprises:
   (a) a transmission line connecting each said pair of said antenna elements of said Van Atta array;
   (b) two capacitors connected to said transmission line and separated by a distance of one-half wavelength;
   (c) one central branch of three-quarter wavelength connected at the midpoint of said transmission line;
   (d) one diode interposed between said transmission line and said central branch such that said diode is connected at the cathode-end of said diode to said transmission line to said midpoint and, at the anode end of said diode, to said central branch;
   (e) at least one input port connected to said central branch at a distance of one half-wavelength from said diode in said central branch;
   (f) two lateral transmission branches wherein each said lateral branch is interposed between one of said capacitors and said midpoint of said transmission line;
   (g) each said lateral branch further comprises a transmission line of one half-wavelength in length connected to ground on one end and connected to a resistor on the other end; said resistor connected to the cathode-end of a diode; said diode connected at anode-end of said diode to said transmission line.

18. A responder mounted to an automotive vehicle comprising:
   (a) at least one receiving antenna means mounted to the automotive vehicle for collecting an interrogation signal from a first direction;
   (b) encoding means connected to said at least one receiving antenna means for encoding information on said interrogation signal; and
   (c) at least one transmitting antenna means connected to said encoding means for retrodirectively retransmitting said interrogation signal encoded with said information in said first direction as a responder signal.

19. The responder of claim 18 wherein said at least one receiving antenna means and said at least one transmitting antenna means are configured as a Van Atta array having at least one pair of antenna elements.
   (a) said Van Atta array is comprised of a plurality of paired antenna elements disposed in a two dimensional configuration, said paired antenna elements of said Van Atta array being disposed in diagonal symmetry around the center of said array; and
   (b) said encoding mens is comprised of means for imposing said code signal to said interrogation signal intermediate each of said elements of respective pairs of said paired antenna elements.

20. The responder of claim 19 wherein said responder is fabricated of monolithic semiconductor material.

21. The responder of claim 19 wherein said responder is fabricated of a combination of monolithic semiconductor integrated circuits and discrete components mounted upon dielectric substrates.

22. The responder of claim 18 wherein said encoding means also comprises an amplifier to amplify said encoded signal prior to transmission in said first direction.

23. The responder of claim 19 wherein said encoding means further comprises means for transmitting said interrogation signal between each said element of said paired antenna elements.

24. The responder of claim 19 wherein said encoding means further comprises a signal absorbing means which absorbs said interrogation signal when said code signal to be imposed upon said interrogation signal passing through said means for transmitting is in "STOP" condition.

25. The responder of claim 19 wherein said encoding means further comprises means for modulating said information on said interrogation signal intermediate said respective elements of said paired antenna elements.

26. The responder of claim 25 wherein said modulation of said interrogation signal is performed in either direction of propagation between said elements of said paired elements of said Van Atta array.

27. The responder of claim 25 wherein the encoding means further comprises means for imposing on the interrogation signal a code indicating the speed of an approaching vehicle transmitted by the approaching vehicle.

28. The responder of claim 25 wherein the encoding means further comprises means for imposing a code on the interrogation signal indicating a geographic location of the responder.

29. The responder of claim 25 wherein said means for modulating said information on said interrogation signal comprises amplitude modulation.

30. The responder of claim 25 wherein said means for modulating said information on said interrogation signal comprises frequency modulation.

31. The responder of claim 25 wherein said means for modulating said information on said interrogation signal comprises phase modulation.

32. The responder of claim 24 wherein said signal absorbing means further comprises:

(a) a transmission line connecting each said pair of said antenna elements of said Van Atta array;
(b) two capacitors connected to said transmission line and separated by a distance of one-half wavelength;
(c) one central branch of three-quarter wavelength length connected at the midpoint of said transmission line;
(d) one diode interposed between said transmission line and said central branch such that said diode is connected at the cathode-end of said diode to said transmission line at said midpoint and, at the anode end of said diode, to said central branch;
(e) at least one input port connected to said central branch at a distance of one half-wavelength from said diode in said central branch;
(f) two lateral transmission branches wherein each said lateral branch is interposed between one of said capacitors and said midpoint of said transmission line;
(g) each said lateral branch further comprises a transmission line of one half-wavelength in length connected to ground on one end and connected to a resistor on the other end; said resistor connected to the cathode-end of a diode; said diode connected at the anode-end of said diode to said transmission line.

33. A method of providing navigation information to a moving vehicle, comprising
transmitting an interrogation signal in the direction of a transponder positioned remote from the vehicle;
collecting the interrogation signal at the responder, relating to navigation of the vehicle;
imposing encoded information relating to navigation of the vehicle on the interrogation signal collected by the responder;
retrodirecting the interrogation signal encoded with the information in the direction of the vehicle as a responder signal;
collecting the encoded responder signal on the vehicle; decoding the encoded information; and indicating on the vehicle the decoded information.

34. The method of claim 33 wherein the step of collecting the interrogation signal at the responder comprises imposing encoded information indicating the geographic location of the vehicle.

35. The method of claim 33 wherein the step of collecting the interrogation signal at the responder comprises imposing encoded information indicating the speed of an approaching vehicle carrying the responder.

36. The method of claim 33 wherein the step of transmitting the signal includes transmitting the signal in opposite directions fore and aft of the vehicle.

* * * * *